United States Patent [19]
Bückle et al.

[11] Patent Number: 5,225,689
[45] Date of Patent: Jul. 6, 1993

[54] REFLECTED LIGHT SENSOR HAVING DUAL EMITTERS AND RECEIVERS

[75] Inventors: Kurt Bückle, Schlierbach; Joachim Manner, Weilheim/Teck; Frank Bauder, Beuren, all of Fed. Rep. of Germany

[73] Assignee: Leuze Electronic GmbH & Co., Owen-Teck, Fed. Rep. of Germany

[21] Appl. No.: 806,243

[22] Filed: Dec. 13, 1991

[30] Foreign Application Priority Data

Dec. 15, 1990 [DE] Fed. Rep. of Germany ....... 4040225

[51] Int. Cl.⁵ ............................................. G01V 9/04
[52] U.S. Cl. .................................. 250/561; 250/221; 250/222.1; 356/1
[58] Field of Search ............... 250/221, 222.1, 561, 250/201.6; 356/1, 4, 141, 152; 340/555, 556, 557

[56] References Cited

U.S. PATENT DOCUMENTS 4,282,430 8/1981 Hatten et al. .
4,659,922 4/1987 Duncan .
4,716,298 12/1987 Etoh .................................. 250/222.1
4,782,224 11/1988 Haas et al. .
4,899,041 2/1990 Fetzer ............................... 250/222.1

FOREIGN PATENT DOCUMENTS 3621961 1/1988 Fed. Rep. of Germany .
3627972 2/1988 Fed. Rep. of Germany .

Primary Examiner—David C. Nelms
Assistant Examiner—K. Shami
Attorney, Agent, or Firm—Spencer, Frank & Schneider

[57] ABSTRACT

A reflected light sensor having a light transmitter including at least two mutually independent light sources and a light receiver including at least two separately evaluatable photosensitive elements. A switching point or distance limit of the light sensor can be continuously varied within a defined sensing range by inversely and continuously controlling currents of the light sources in accordance with a control voltage $U_{St,LED}$, or by continuously varying a first and a second independent control voltage thereby controlling gains of signals at the output of the photosensitive elements.

13 Claims, 6 Drawing Sheets

REFLECTED LIGHT SENSOR HAVING DUAL EMITTERS AND RECEIVERS

CROSS REFERENCE TO RELATED APPLICATIONS

The present application claims the rights of priority with respect to application Ser. No. P 40 40 225.8 filed Dec. 15, 1990 in Germany, the subject matter of which is incorporated herein by reference.

BACKGROUND OF THE INVENTION

The present invention relates to a reflected light sensor for detecting the presence or absence of an object.

A light sensor for detecting the presence of an object is disclosed in German Patent No. 3,513,671 and corresponding U.S. Pat. No. 4,782,224. In this system, a distance limit or remote switching point of the light sensor can be varied by employing a rotatably mounted deflection mirror. That is, the mirror is arranged to pivot thereby changing the location of the focal point of a bundle of received light in a direction transverse to an optical axis on a photoelectric transducer arrangement. The photoelectric transducer arrangement is composed of two photoelectric elements whose output signals charge a differential amplifier. Hence, a signal corresponding to a difference between radiation energies incident on the two photoelectric elements is present at the output of the differential amplifier.

In order to distinguish between a first state where a sensed object is disposed between the remote switching point and the light sensor and a second state where a sensed object is disposed at a distance greater than the remote switching point, the output signal of the differential amplifier is fed to an evaluation circuit which evaluates its amplitude and sign. If the output signal is positive, for example, and reaches a response threshold provided in the evaluation circuit, the sensed object is disposed between the remote switching point and the light sensor. If, however, the signal becomes smaller than the response threshold, the sensed object is disposed at a distance greater than the remote switching point.

In a reflected light sensor disclosed in German Patent No. 2,924,685 and corresponding U.S. Pat. No. 4,282,430, a light source with a first optical axis and a light receiver with a second optical axis are each accommodated in a pivotal mount positioned between the first and second optical axes. This makes it possible to vary an angle which defines a remote switching point or distance limit. Here, the mounts are pivoted by means of a spindle drive, thus changing the angle at which the two axes of the optical systems intersect each other and consequently changing the remote switching point or distance limit.

The drawback in such a light sensor is that some of its optical and/or optoelectronic components are not fixed to a housing but must instead be displaceable in the housing and only then is it possible to adjust the location of the remote switching point. Such a structure requires a lot of equipment, is complicated to install and is not very stable. In addition, the electrical line arrangement must be designed to allow the necessary freedom of pivotal movement and the entire arrangement requires a lot of space.

SUMMARY OF THE INVENTION

Therefore, it is an object of the present invention to provide for a light sensor of the above-mentioned type in which all optical and optoelectrical components as well as the entire electronic unit is fixed in a housing while at the same time maintaining an ability to vary its remote switching point.

This is accomplished in the present invention by providing a reflected light sensor for sensing a presence or absence of an object within a variable distance limit located within a defined sensing range, including: a light transmitter including at least two mutually independent light sources; a transmitting frontal lens arranged in front of the light transmitter; a light receiver arranged adjacent to the light transmitter and including at least two separately evaluatable photosensitive elements for producing, respectively, first and second signals in dependence of the presence of light from the light transmitter reflected off the object; a receiving frontal lens arranged in front of the light receiver; differential amplifying means electrically coupled to the light receiver for receiving the first and second signals from the at least two photosensitive elements and outputting a differentially amplified signal; an evaluation circuit coupled to the differential amplifying means for receiving and evaluating the amplitude and polarity of the differentially amplified signal and outputting a binary signal having a value signifying the presence or absence of the object within the distance limit; and light adjusting means coupled to the light transmitter for inversely and continuously controlling currents of the at least two light sources in accordance with a control voltage for continuously adjusting output intensities of the at least two light sources to thereby continuously adjusting the distance limit (remote switching point) within the defined sensing range.

In accordance with another aspect of the invention, the remote switching point can be varied, in combination with or as an alternative to the light adjusting means, by controlling the gain of the various light detectors using a gain adjusting means thereby weighting the photosensitive elements of the light receiver.

Therefore, it is possible to realize a light sensor with a continuously variable remote switching point which is varied solely by adjusting electronic parameters, wherein all optical, optoelectronic and electronic components comprising the light sensor can be fixed (immovable) in the housing.

In a further aspect of the invention, there is provided a light sensor which has two remote switching points at different distances from the light sensor, that is, which distinguishes between the following three situations by simple electronic multiplexing: (i) the situation (or state) in which the sensed object is disposed between the remote switching point at the shorter distance and the light sensor; (ii) the situation (or state) in which the sensed object is disposed between the two remote switching points; and (iii) the situation in which the sensed object is disposed at a distance greater than the remote switching point at the greater distance.

Hence, the invention provides a simple approach to detecting objects in front of a first defined switching point, between a first and a second switching point and behind the second switching point, with each object being associated with its corresponding distance value.

The light sensor can be modified to have many remote switching points at continuously varying or arbitrarily set distances. This is accomplished by continuously varying controlling currents of the various light centers of the light source and/or continuously varying the gain of the photosensitive elements of the light receiver. This continuous control may be attained, for example, by means of a sawtooth shaped control signal, whereby the remote switching point is always traversed, independently of the distance value resulting from the control signal, provided the switching point is in a predetermined sensing range and a correspondingly associated amplitude value of the sawtooth control signal corresponds to an actual distance value of the sensed object. Here the light sensor is acting as a distance sensor.

The invention will now be described in greater detail with reference to an embodiment thereof that is illustrated in the drawing figures.

DETAILED DESCRIPTION OF THE PREFERRED EMBODIMENT

Figure 1:
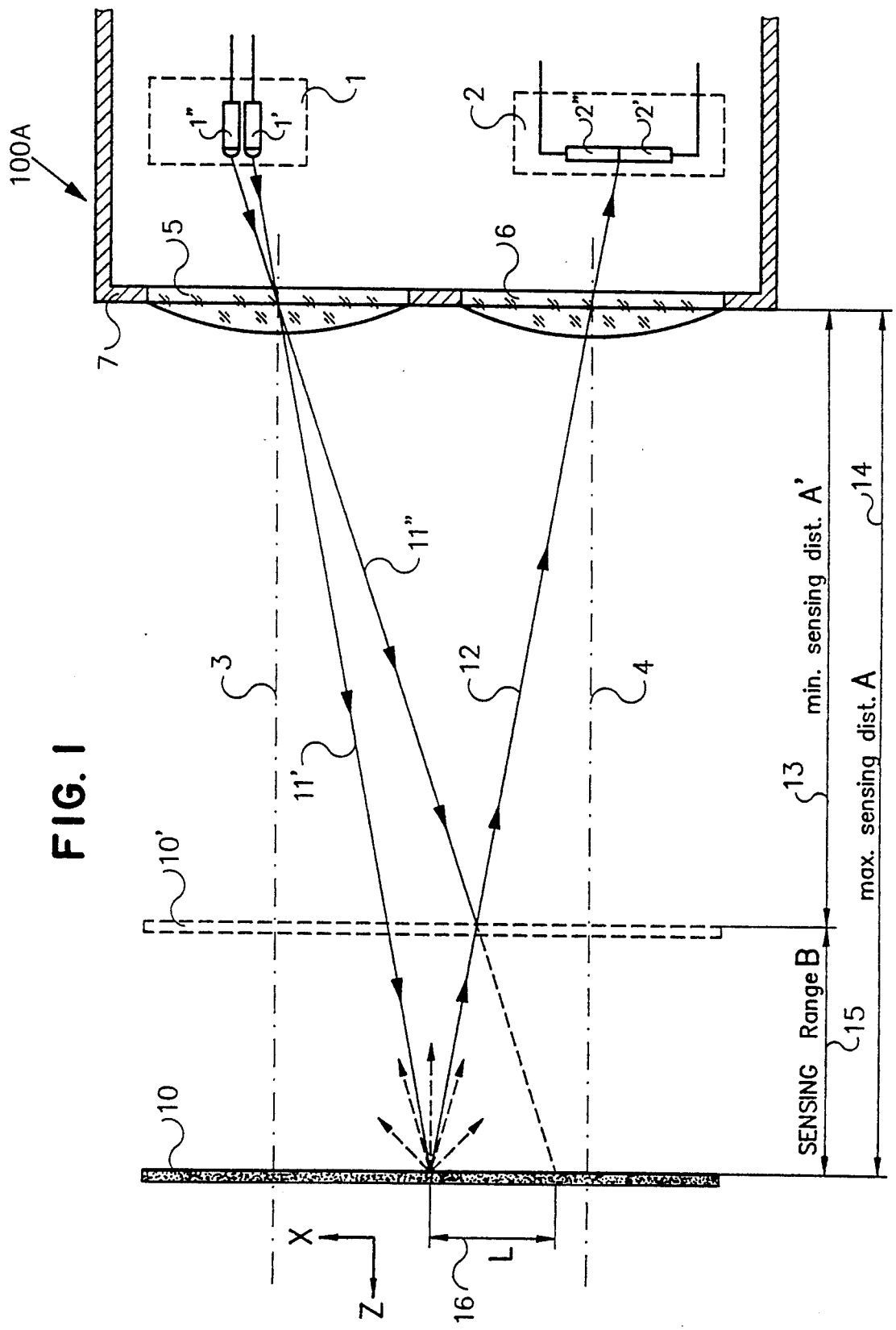
FIG. 1 is a schematic, in partial section, of a front end of a reflected light sensor according to the invention which shows central beams of two transmitted light bundles and a central beam of a received light bundle with a sensed object at two different positions on the Z axis.

FIG. 1 shows a front end 100a of a reflected light sensor 100 (in FIG. 2) according to one embodiment of the invention. Front end 100a is composed of a light transmitter 1 having two light centers (emitters) 1' and 1" as well as a light receiver 2 having two photosensitive elements 2' and 2". Light centers 1' and 1" are imaged by a common optical transmitting lens unit 5 onto a surface of a sensed object 10 or 10', respectively. For reasons of simplicity, only two central beams 11' and 11" of light transmitted by light centers 1' and 1" are shown in FIG. 1. The two transmitted light bundles with central beams 11' and 11" are scattered diffusely by the sensed object 10 or 10', respectively, and are imaged by an optical receiving lens unit 6 onto light receiver 2 with photosensitive elements 2' and 2". Here again, for the sake of simplicity, only the central beam 12 is shown at the receiving end, that is, at light receiver 2. Central beam 12 arises if either sensed object 10 is disposed at a maximum sensing distance A and only light center 1' is actuated, or sensed object 10' is disposed at a minimum sensing distance A' and only light center 1" is active. The distance 16 in the X direction between central beams 11' and 11" on sensed object 10 at the maximum sensing distance A corresponds to length dimension L.

Figure 2:
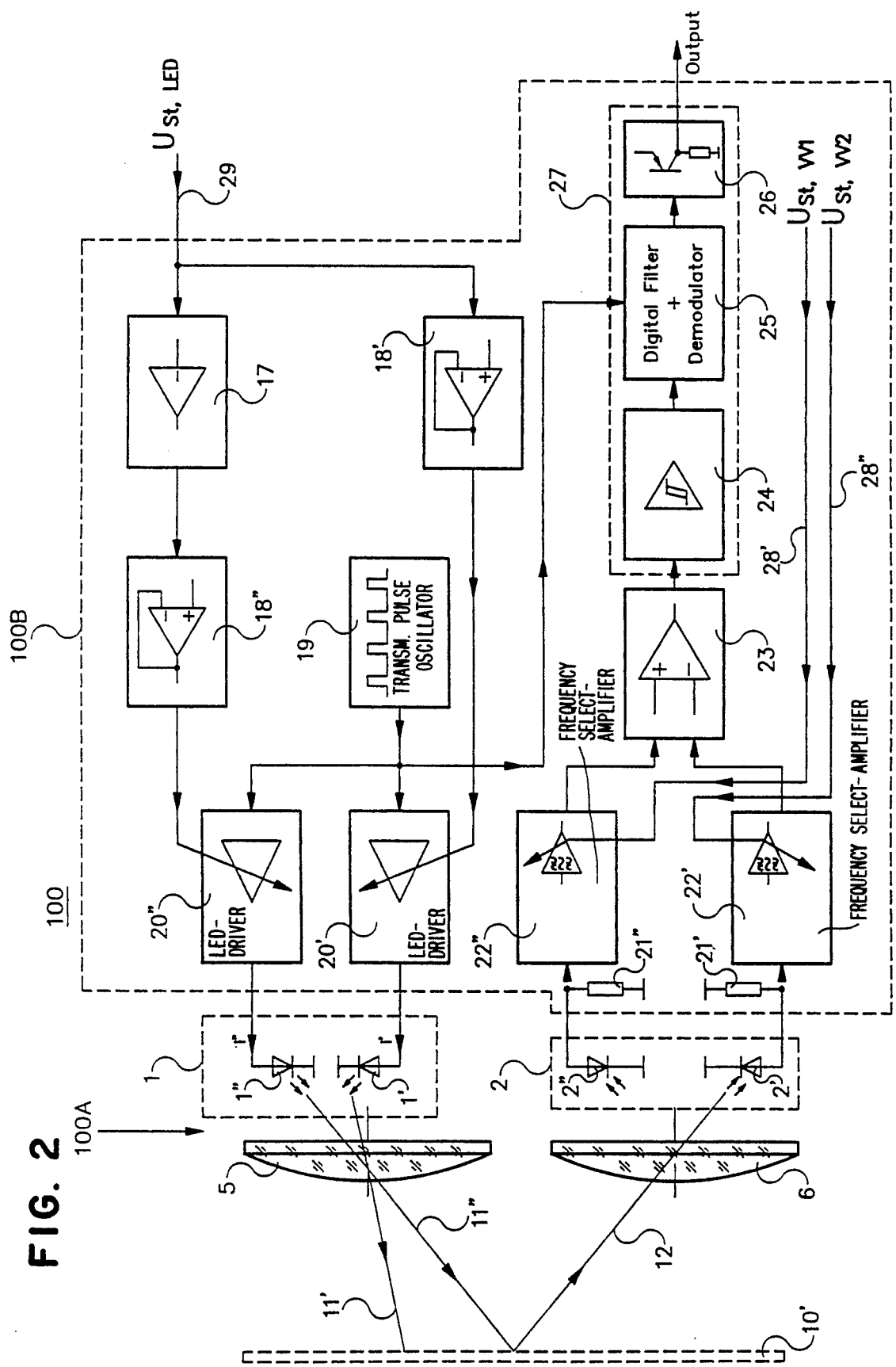
FIG. 2 is a block circuit diagram of a reflected light sensor according to an embodiment of the invention.

Photocurrents of photosensitive elements 2' and 2" of light receiver 2 are converted to voltages by current-to-voltage converters 21' and 21" as shown in FIG. 2. Resulting voltage signals are then separately preamplified by preamplifiers 22' and 22", which in turn output two preamplified signals to a differential amplifier 23. A resulting output signal from differential amplifier 23 is input to an evaluation circuit 27 which evaluates its amplitude and sign. If this output signal becomes positive, for example, and reaches a response threshold voltage in evaluation circuit 27, this corresponds to the case in which the sensed object is disposed between the remote switching point and the light sensor. If the signal is positive but lower than the response threshold, it follows that the sensed object is disposed at greater distances than the remote switching point.

FIG. 2 shows a backend electronic unit 100b of reflected light sensor 100. The intensity of light centers 1', 1" can be continuously and inversely controlled in accordance with a control voltage $U_{St,LED}$ applied to at control input 29 of electronic unit 100b. Namely, continuously varying control voltage $U_{St,LED}$ continuously adjusts the outputs of voltage followers 18' and 18" which in turn continuously adjust the gain of LED drivers 20', 20", respectively. Then, continuously adjusting the gain of LED drivers 20' and 20" continuously adjusts current amplitudes i', i", respectively, which in turn continuously and inversely adjusts the output intensity of light centers 1', 1", respectively, (see also FIG. 3). A transmitting pulse oscillator 19 determines the width and repetition rate of current pulses which control light centers 1', 1" of light source 1.

At the receiving end, pre-amplifiers 22', 22" follow photosensitive elements 2', 2", respectively, to provide frequency selective preamplification. The gain of pre-amplifiers 22', 22" is adjustable by control voltages $U_{St,VV1}$ and $U_{St,VV2}$ on control lines 28', 28", respectively. Hence, a different weighting of photosensitive elements 2', 2" is possible by means of control voltages $U_{St,VV1}$ and $U_{St,VV2}$, respectively, and consequently the distance limit or switching point can be varied by varying control voltages $U_{St,VV1}$ and $U_{St,VV2}$, respectively.

Signals output from preamplifiers 22', 22" are input to a differential amplifier 23 which in turn outputs a signal to a threshold amplifier 24 in evaluation circuit 27. Threshold amplifier 24 outputs a signal to a digital filtering/demodulation circuit 25 also located in evaluation circuit 27. Digital filtering/demodulation circuit 25 outputs a resulting binary signal which does or does not activate output receiver 26 depending on whether or not there is an object between the switching point and front end 100a of reflected light sensor 100.

Figure 3:
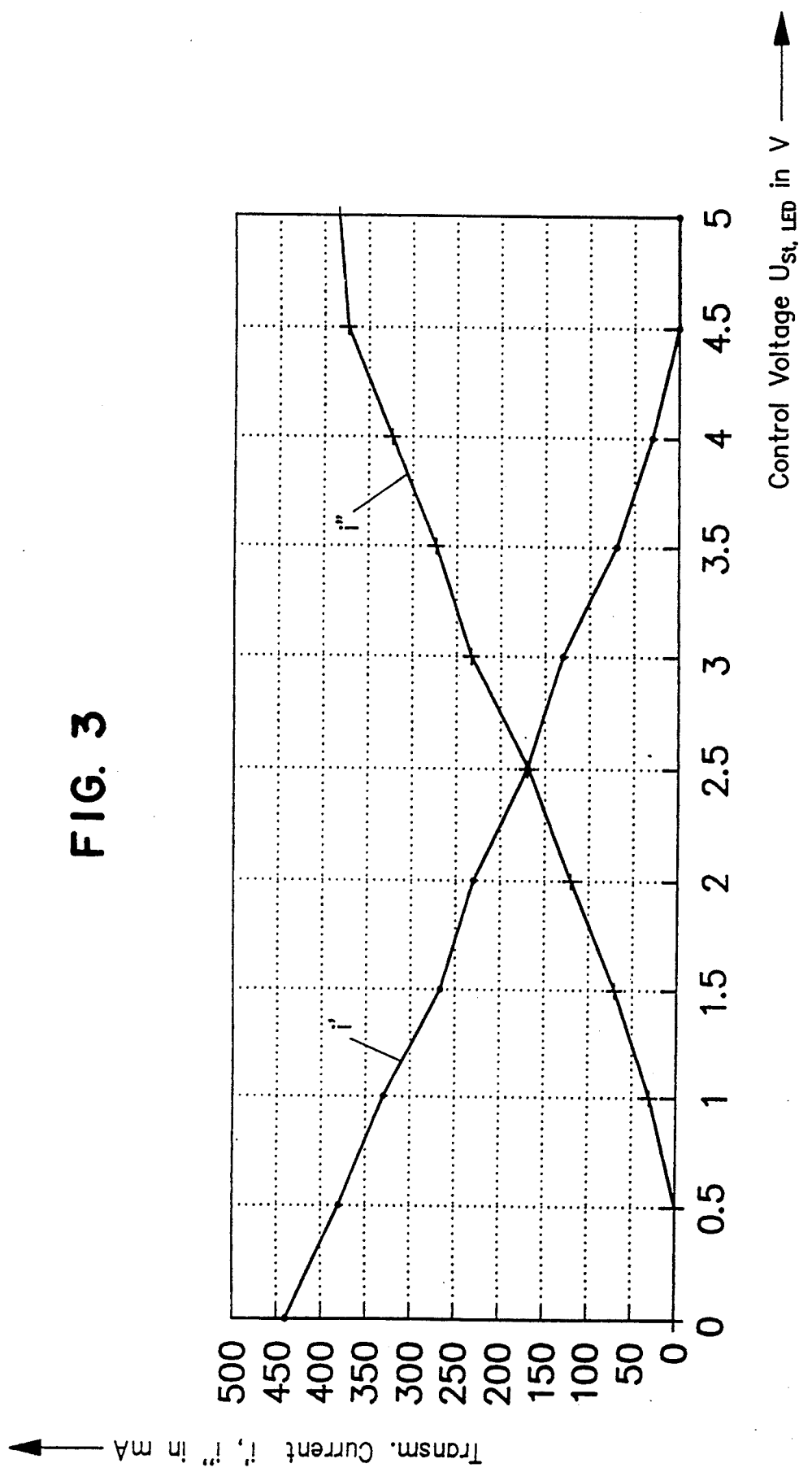
FIG. 3 is a graph which shows current amplitudes charging two light centers as a function of a control voltage $U_{St,LED}$ for electronically setting the remote switching point in accordance with one embodiment of the invention.

FIG. 3 shows the relationship between transmitted currents i', i" of light centers 1', 1", respectively, as a function of control voltage $U_{St,LED}$. As discussed above, the intensity of light centers 1', 1" can be controlled continuously by varying the control voltage $U_{St,LED}$.

Figure 4A:
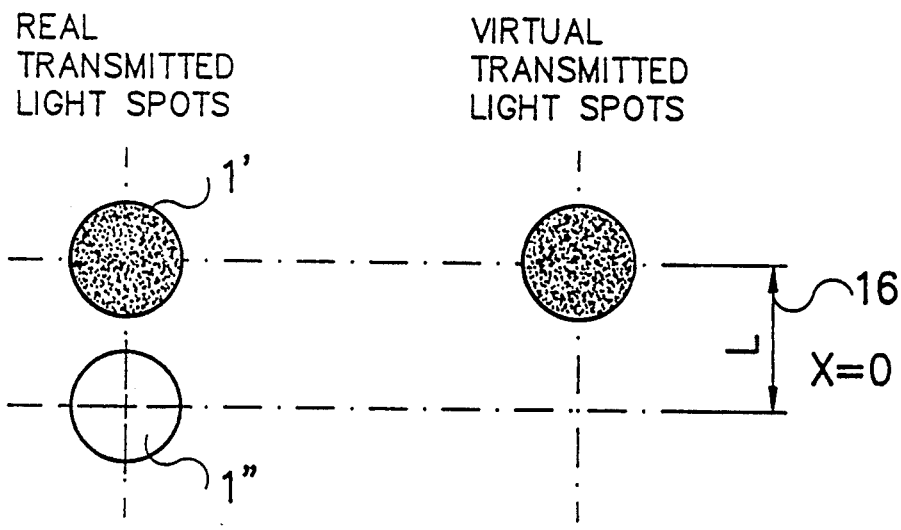
FIGS. 4a–4c are schematic illustrations of real transmitted light spots as well as virtual transmitted light spots on the sensed object for three different control voltages $U_{St,LED}$ according to FIG. 3 whereby in FIG. 4a, $U_{St,LED}=0$ V, in FIG. 4b $U_{St,LED}=2.5$ V and in FIG. 4c $U_{St,LED}=5$ V.
Figure 4B:
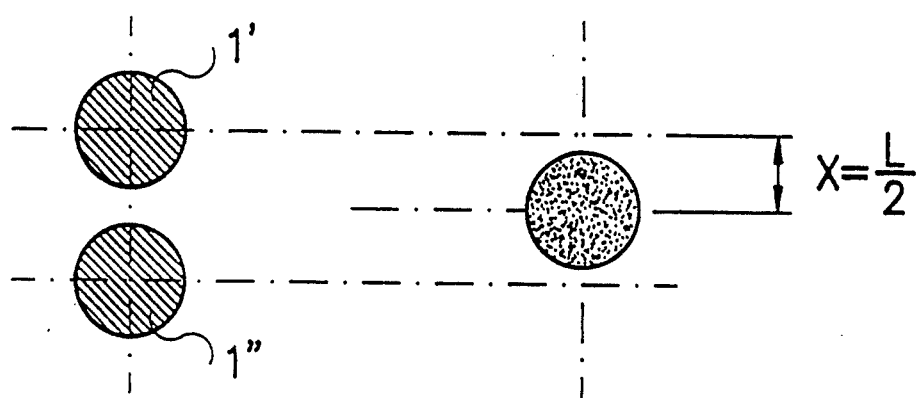
Figure 4C:
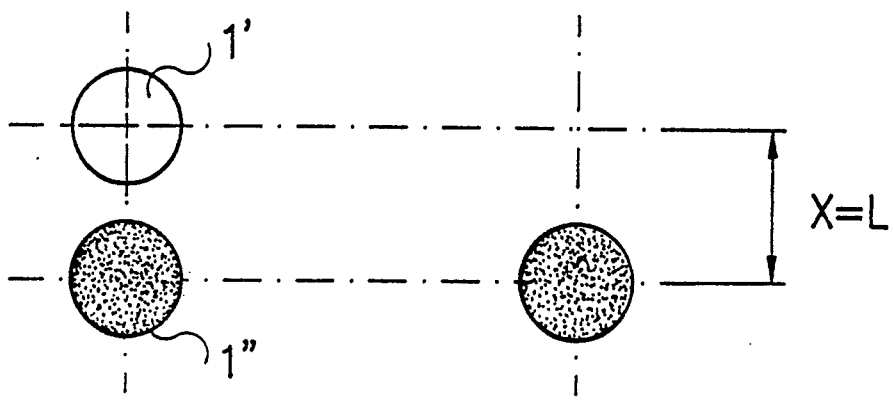

The effect of controlling the intensity of light centers 1', 1" becomes particularly clear in view of FIGS. 4a to 4c which illustrate real transmitted light spots on the sensed object 10 and virtual light spots (that is, light spots which can be constructed mentally to facilitate understanding) for three situations where:

in FIG. 4a—$U_{St,LED}=0$ V and thus full brightness exists in light center 1' and absolute darkness in light center 1";

in FIG. 4b—$U_{St,LED}=2.5$ V and thus the same brightness exists in both light centers 1' and 1"; and in FIG. 4c—$U_{St,LED}=5$ V and thus full brightness exists in light center 1" and absolute darkness in light center 1'.

Corresponding to these three situations, a virtual light spot can be imagined to wander from top to bottom as shown in FIGS. 4a–4c. Hence, $U_{St,LED}$ can be discretely varied so that light sensor 100 has three discrete switching points or distance limits, namely at, A, A'+B/2 and A' corresponding to control voltages $U_{St,LED}=0$ V, 2.5 V and 5 V, respectively. Also, $U_{St,LED}$ can be continuously varied resulting in an infinite number of switching points between A' and A.

Figure 5:
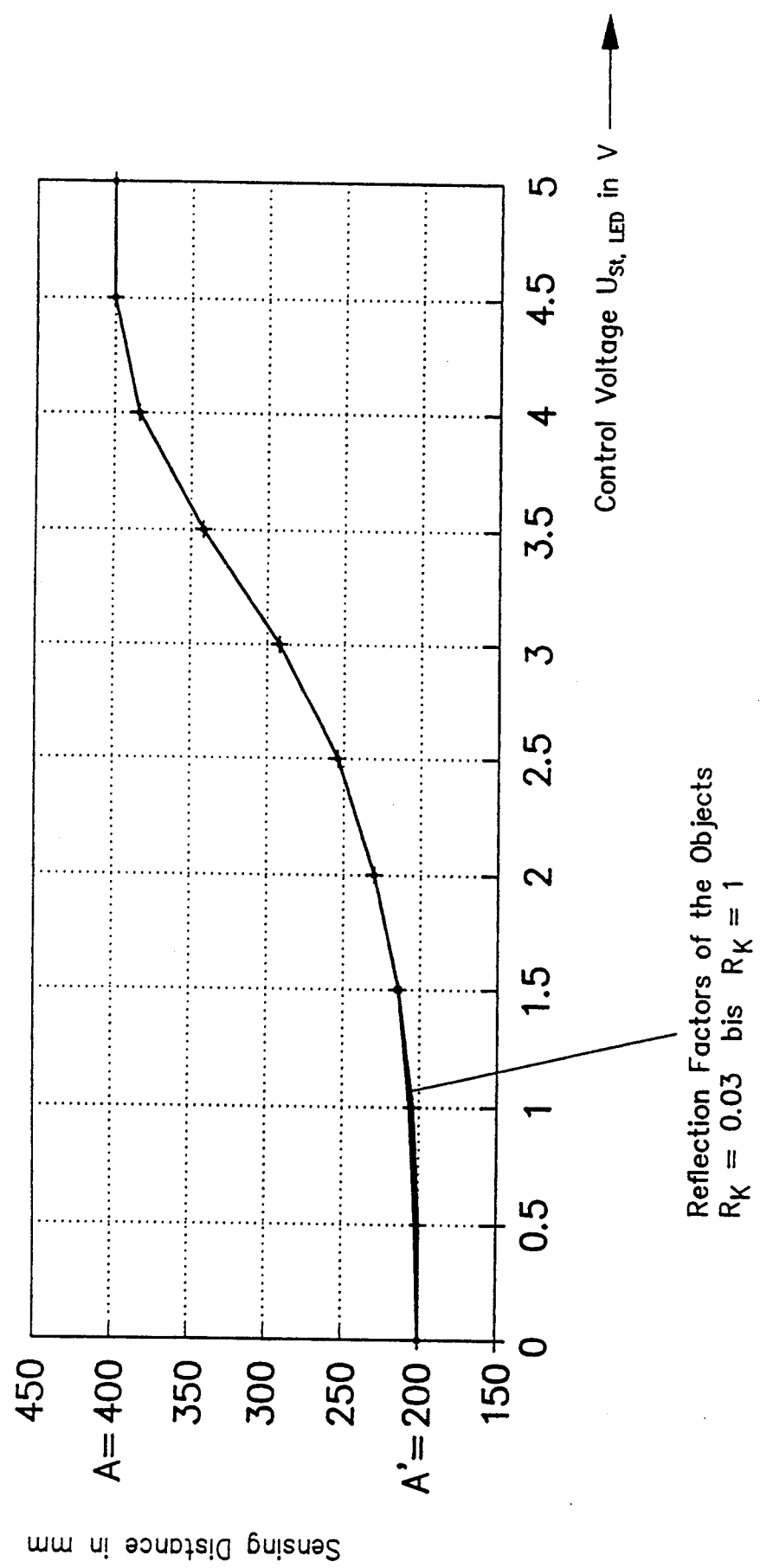
FIG. 5 is a graph which shows an example of a functional relationship in a sensing range B in mm and control voltage $U_{St,LED}$ in volts for reflection factors $R_K=0.03$ to $R_K=1$.

FIG. 5 shows the result of the electronically variable adjustment distance in sensing range B (see FIG. 1) as a function of control voltage $U_{St,LED}$, for reflection factors of $R_K=-0.03$ to $R_K=1$. As can be seen, continuously varies the distance limit or switching point from a minimum distance limit A'=200 mm to a maximum distance limit A=400 mm yielding a sensing range B=200 mm.

Figure 6:
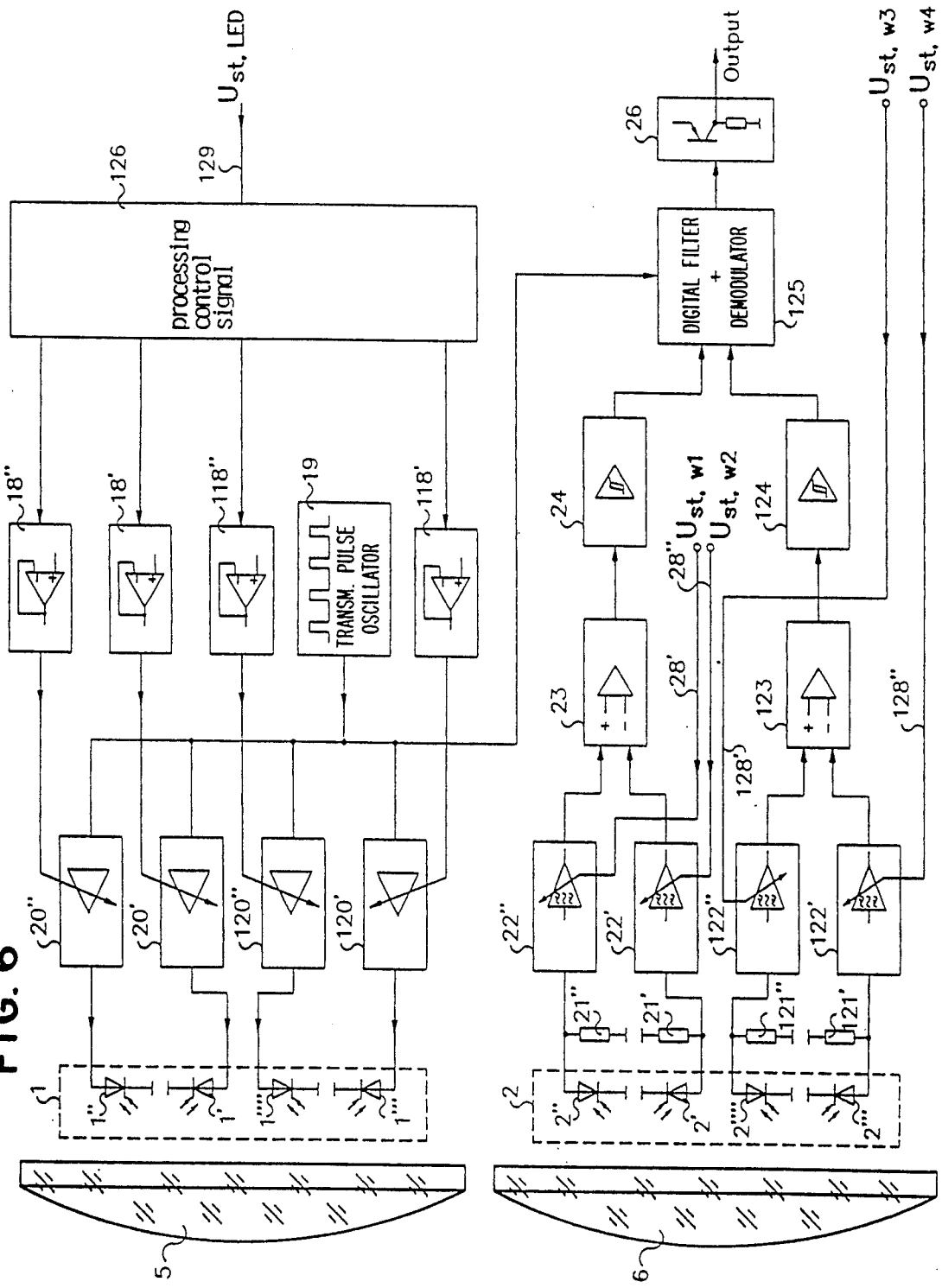
FIG. 6 is a block circuit diagram of a reflected light sensor like FIG. 2, however, having four light sources and four photosensitive elements.

FIG. 6 shows an embodiment of the invention in which the reflected light sensor 100 has four light centers 1', 1", 1''', 1'''' and four photosensitive elements 2', 2", 2''', 2''''.

The transmitting pulse oscillator 19 is controlling all the LED drivers 20', 20", 120', 120" of the corresponding light centers 1', 1", 1''', 1''''.

The voltage followers 18', 18", 118', 118" cooperate with a control signal processor 126, to which the control voltage $U_{St,LED}$ is applied. The gain of additive preamplifiers 122', 122" is adjustable by control voltages $U_{St,W3}$ and $U_{St,W4}$ on control lines 128', 128". Both receiving channels 23, 24; 123, 124 are connected to the digital filtering/demodulator circuit 125.

The number of sensing zones increases with the number of the used light centers, and the number of the photosensitive elements brings about an extension of the range.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A reflected light sensor for sensing a presence or absence of an object within a variable distance limit located within a defined sensing range, comprising:

a light transmitter including at least two mutually independent light sources;

a transmitting frontal lens arranged in front of said light transmitter;

a light receiver arranged adjacent to said light transmitter and including at least two separately evaluatable photosensitive elements for producing, respectively, first and second signals in dependence of the presence of light from said light transmitter reflected off the object;

a receiving frontal lens arranged in front of said light receiver;

differential amplifying means electrically coupled to said light receiver for receiving the first and second signal from said at least two photosensitive elements and outputting a differentially amplified signal;

an evaluation circuit coupled to said differential amplifying means for receiving and evaluating the amplitude and polarity of the differentially amplified signal and outputting a binary signal having a value signifying the presence or absence of the object within the variable distance limit; and light adjusting means coupled to said light transmitter for inversely and continuously controlling currents of said at least two light sources in accordance with a control voltage for continuously adjusting output intensities of said at least two light sources to thereby continuously adjust the distance limit within the defined sensing range.

2. A reflected light sensor as defined in claim 1, further comprising gain adjusting means coupled to said light receiver and receiving first and second control voltages for continuously and independently weighting the first and second signals output from said at least two photosensitive elements in accordance with the first and second control voltages, respectively, thereby continuously adjusting the distance limit within the defined sensing range.

3. A reflected light sensor for sensing a presence or absence of an object within a variable distance limit located within a defined sensing range, comprising:

a light transmitter including at least two mutually independent light sources;

a transmitting frontal lens arranged in front of said light transmitter;

a light receiver arranged adjacent to said light transmitter and including at least two separately evaluatable photosensitive elements for producing, respectively, first and second signals in dependence of the presence of light from said light transmitter reflected off the object;

a receiving frontal lens arranged in front of said light receiver;

differential amplifying means electrically coupled to said light receiver for receiving the first and second signals from said at least two photosensitive elements and outputting a differentially amplified signal;

an evaluation circuit coupled to said differential amplifying means for receiving and evaluating the amplitude and polarity of the differentially amplified signal and outputting a binary signal having a value signifying the presence or absence of the object within the variable distance limit; and gain adjusting means coupled to said light receiver and receiving first and second control voltages for continuously and independently weighting the first and second signals output by said at least two photosensitive elements in accordance with the first and second control voltages, respectively, thereby continuously adjusting the distance limit within the defined sensing range.

4. A reflected light sensor as defined in claim 1, wherein said light transmitter includes N freely selectable and mutually independent light sources and said light receiver includes M mutually separate photosensitive elements where N and M are integers equal to or greater than 2.

5. A reflected light sensor as defined in claim 4, wherein said light adjusting means includes means for continuously controlling currents of said N light sources.

6. A reflected light barrier as defined in claim 3, wherein said gain adjusting means includes means for separately and continuously amplifying the first and second signals output of said at least two photosensitive elements.

7. A reflected light sensor as defined in claim 1, wherein the control voltage is sawtooth-shaped.

8. A reflected light sensor as defined in claim 3, wherein said gain adjusting means comprises a current-to-voltage converting means for converting currents of the first and second signals output from said at least two photosensitive elements to first and second voltage signals.

9. A reflected light sensor as defined in claim 8, wherein said gain adjusting means preamplifies the first and second signals output from said at least two photosensitive elements according to a frequency selective behavior variable in accordance with the first and second control voltages, respectively.

10. A reflected light sensor as defined in claim 1, wherein said light adjusting means comprises at least two voltage followers for receiving the control voltage and at least two light source drivers connected to said voltage followers for driving said at least two light sources.

11. A reflected light sensor as defined in claim 1, wherein the sensing range is defined by at least two different, independently adjustable switching points corresponding to at least two different values of the control voltage.

12. A reflected light sensor as defined in claim 1, further comprising a sensor housing, said transmitter, transmitting frontal lens, receiver, receiving frontal lens, evaluation circuit and light adjusting means being immovably disposed in said sensor housing.

13. A reflected light sensor as defined in claim 3, further comprising a sensor housing, said transmitter, transmitting frontal lens, receiver, receiving frontal lens, evaluation circuit and gain adjusting means being immovably disposed in said sensor housing.

* * * * *